J. C. E. ALLUM & J. F. PERKINS.
REVERSIBLE TYPE WRITER KEY.
APPLICATION FILED OCT. 10, 1913.

1,093,372.

Patented Apr. 14, 1914.

2 SHEETS—SHEET 1.

WITNESSES:
Harry A. Beimer
Josa michel

INVENTORS.
James C. E. Allum
Josiah F. Perkins.
BY
ATTORNEY.

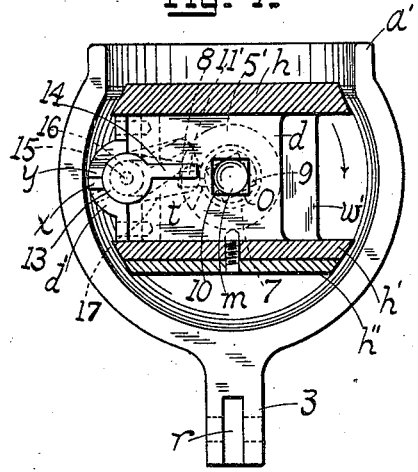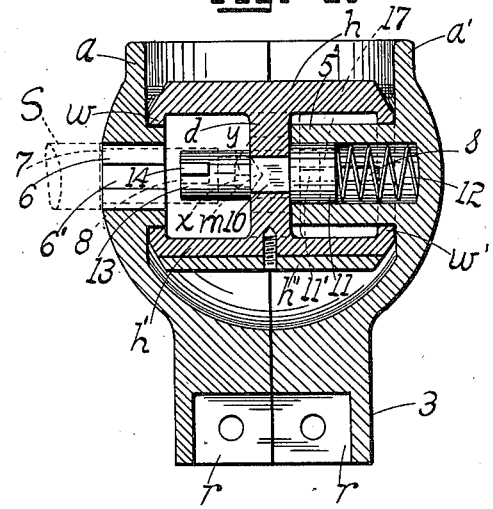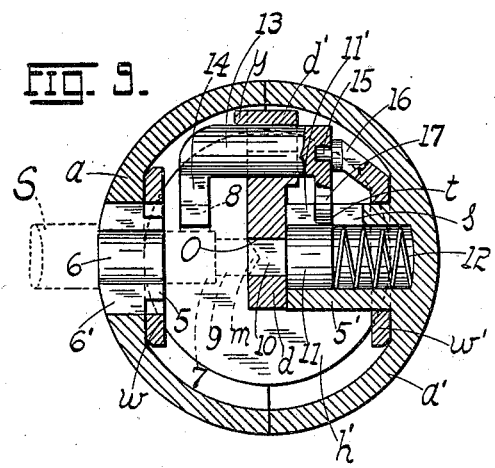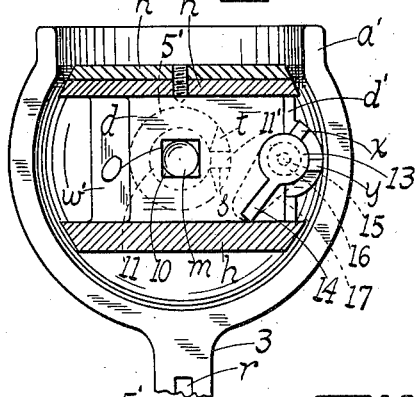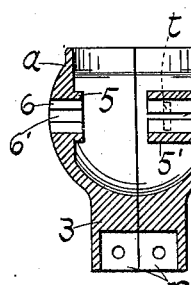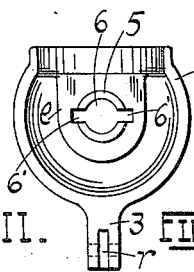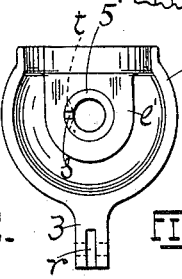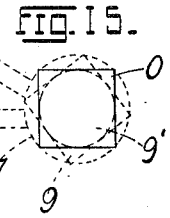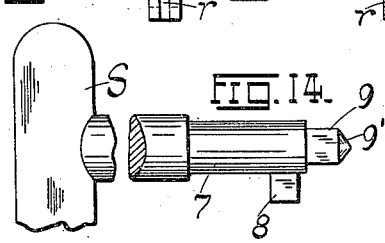

UNITED STATES PATENT OFFICE.

JAMES C. E. ALLUM AND JOSIAH F. PERKINS, OF CHICAGO, ILLINOIS, ASSIGNORS OF ONE-THIRD TO CHARLES B. YODER, OF ST. LOUIS, MISSOURI.

REVERSIBLE TYPE-WRITER KEY.

1,093,372. Specification of Letters Patent. Patented Apr. 14, 1914.

Application filed October 10, 1913. Serial No. 794,442.

*To all whom it may concern:*

Be it known that we, JAMES C. E. ALLUM and JOSIAH F. PERKINS, citizens of the United States, residing at Chicago, in the county of Cook and State of Illinois, have invented certain new and useful Improvements in Reversible Type-Writer Keys, of which the following is a full, clear, and exact description, reference being had to the accompanying drawings, forming a part hereof.

Our invention has relation to improvements in type-writer keys; and it consists in the novel features of construction more fully set forth in the specification and pointed out in the claims.

Figure 1:
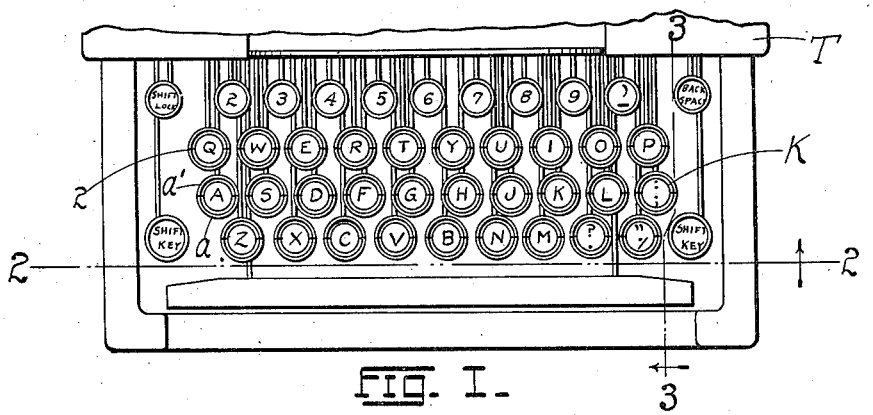
Figure 2:
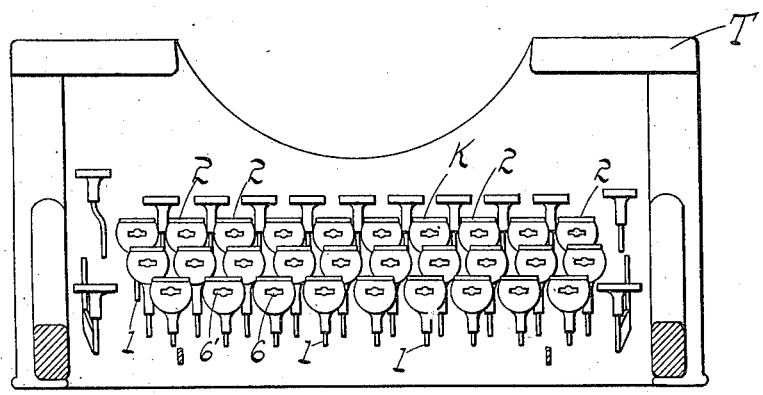
Figure 3:
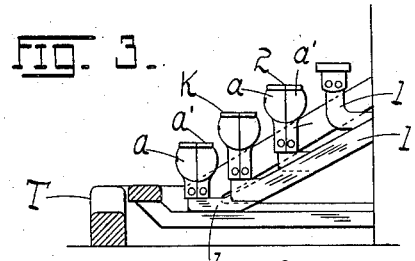
Figure 4:
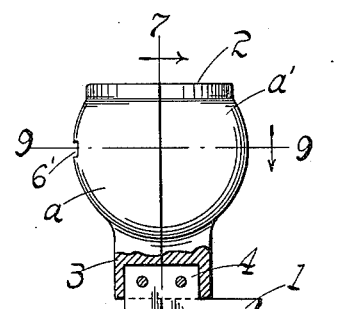
Figure 5:
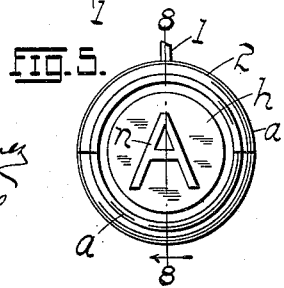
Figure 6:
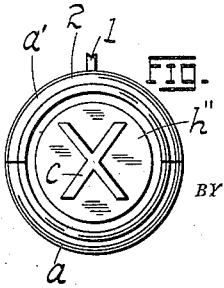

In the drawings, Figure 1 is a top plan view of a conventional type-writer key-board showing our invention applied thereto; Fig. 2 is a vertical transverse section on the line 2—2 of Fig. 1; Fig. 3 is a vertical cross-section on the line 3—3 of Fig. 1; Fig. 4 is an enlarged side elevational detail of the outer casing or socket forming a component part of a key; Fig. 5 is a top plan of Fig. 4 with the key turned to present a normal type character; Fig. 6 is a similar view with key turned to present or expose a "code" character; Fig. 7 is an enlarged vertical section on the line 7—7 of Fig. 4 showing the normal character on top; Fig. 8 is an enlarged middle vertical section through one of the keys taken on the line 8—8 of Fig. 5; Fig. 9 is an enlarged horizontal section on the line 9—9 of Fig. 4; Fig. 10 is a section similar to Fig. 7, with the character-supporting member turned one-hundred and eighty degrees to expose the code character as shown in Fig. 6; Fig. 11 is a section on the order of Fig. 8, limited however, to the outer casing or socket which houses the character-supporting member; Fig. 12 is an inner face elevation of one of the sections of said socket; Fig. 13 is an inner face elevation of the opposite or complementary section; Fig. 14 is a side elevational detail (broken) of the operating key or tool for turning the character-supporting member of the type-writer key; and Fig. 15 is a diagrammatic view showing the manner of insertion of the operating key into the character-key for purposes of rotating the latter.

The object of our invention is to provide a reversible type-writer key provided with two (or more) characters adapted to be exposed singly to the touch of the operator, one of said characters corresponding to the character carried by the type-bar controlled by said key. In the present embodiment of our invention we show a reversible (rotatable) key on which two characters are mounted diametrically opposite one another, one set of characters having a corresponding set on the type-bars. By this arrangement we may form a key-board by which a communication, letter or message, corresponding to the keys operated, may be written or impressed on the letter paper impinged by the type-bars; or, by reversing the several keys we may form a key-board which is out of harmony, or out of correspondence with, the characters on the type-bars, the second key board being thus serviceable in writing a "code" message on the paper inserted into the machine. For convenience, we will refer to the key board characters which do not correspond with the type-bar characters, as the "code" characters, those which do correspond to the type-bar characters, being designated as "normal" or regular.

A further object of the invention is to provide means for changing the code characters, the latter being removable from the several keys.

A further object is to provide features of construction the advantages of which will be fully apparent from a detailed description of the invention which is as follows:—

Referring to the drawings, T represents a portion of a type-writer frame and K a conventional key-board, the keys being mounted at the outer free ends of the key-levers 1, 1, as well understood in the art. In the present embodiment of our invention each key (or character carrying member) is mounted in a cup-shaped casing or socket 2, the said socket being composed of two sections or halves $a$, $a'$, separating along a vertical plane, the casing terminating in a basal stem 3 provided with a pocket or recess $r$ to receive the terminal up-turned lug 4 of the key-lever, to which lug the said casing is riveted or otherwise secured (Fig. 4). Any other mechanical manner of securing the casing or socket 2 to the key-lever is however contemplated by our invention. The sections $a$, $a'$ composing the socket 2 are provided with hollow bosses 5, 5', respectively for the support of the inner rotatable key (or character-carrying member), said key comprising two circular plates or disks *h*, *h'*, respectively, the latter disk having detachably secured thereto an outer disk *h''* on which are marked the "code" characters *c* (Fig. 6), the face of the disk *h* having marked thereon the normal characters *n* (Fig. 5). Disposed centrally between the disks *h*, *h'*, is a wall or partition *d*, the end walls *w*, *w'*, of the key being provided with circular openings to receive the bosses 5, 5', of the respective sections *a*, *a'*, of the casing 2. The object of making the casing 2 in two halves is now apparent, the boss 5 of one of the halves being inserted through the wall *w*, and the boss 5' of the other half being inserted through the wall *w'*, said boss 5' reaching to the adjacent face of the wall *d* when the parts are assembled. The sections *a*, *a'*, are provided around their respective bosses 5, 5', with plane smooth faces *e*, *e'*, to reduce friction when occasion arises to rotate the key. The casings 2 are open at the top and through these openings, the characters on the keys are exposed to the eye and fingers of the operator. For ordinary correspondence, the normal letters or characters are left exposed. For code messages the "code" characters *c* are exposed, the several keys being turned sufficiently (in the present case through an arc of one-hundred and eighty degrees) to depress the normal character or bring the same within the casings 2, and to bring the code characters to the top (Fig. 6).

A few examples of normal and their corresponding code characters will answer our purpose and are here given, it being understood that these may be changed from time to time, the codes being marked on the removable plates *h''* as previously pointed out. Thus—

Normal A—code X, Normal H—code A,
" T— " L, " I— " R,
" O— " B, " P— " T,
" N— " U, " M— " S,
" C— " N, " E— " K.
" S— " M, If therefore, we wish to write an ordinary message, such as "Ship me at once", we have only to operate the keys with the normal characters exposed to the fingers of the operator. By reversing the keys so as to expose the code alphabet or characters, it is obvious that if we write the same message "Ship me at once", the type-bars will no longer record the same message, but on the contrary will write the corresponding code message reading—"Mart sk xl bunk", which when translated means "Ship me at once". With a business house or bank the code need not even be known to the operator. As to him the message or letter will appear regular so far as the manipulation of the keys is concerned, and even should the operator acquire the code, the latter would not be intelligible to others through whose hands it passed, and thus an exclusively private and secret correspondence may be carried on between the immediate parties who have knowledge of the code. The above is but a single illustration of the many uses to which a machine equipped with our reversible key may be put, and other examples are not here necessary.

The mechanism by which a key may be rotated to expose first a normal and then its corresponding code character may be varied, but we have found that here illustrated eminently satisfactory in practice. This mechanism is as follows:—The wall of the casing section *a* opposite the hollow boss 5 is provided with a circular opening 6 for the insertion of the cylindrical shank 7 of a key S, the said opening having leading therefrom suitable diametrically disposed recesses 6', 6', for the reception of the tooth or process 8 carried by said stem. The stem 7 terminates in a reduced square extension 9 provided with a conical end 9'. Formed in the wall *d* and in alinement with the opening 6 is a square opening O which loosely receives the square stem 10 of a piston or plunger 11 reciprocating in the chamber of the hollow boss 5', a compression spring 12 in said chamber normally forcing the piston against the wall *d*, and forcing the stem 10 into the opening in said wall (Fig. 9). Mounted rotatably in a bearing *d'* of the wall *d* is a gravity tumbler 13 whose front end is provided with an arm 14 adapted to be engaged and tripped by, the tooth 8 of of the key S. Longitudinal or axial displacement of the tumbler is prevented by a pin or stud 15 at the end of an arm 16 formed with the wall *w'*, the pin entering a socket formed in the rear end of the tumbler. The inner end of the tumbler is provided with an arm 17 free to swing across the peripheral longitudinal slot *s* formed in the wall of the boss 5', said arm, when the tumbler is in its normal position, engaging the rear face of a tongue or lug 11' secured to, or formed with, the piston 11, and traversing the said slot *s*. To permit the arm 17 to swing to a position opposite to, and in engagement with, the tongue 11', the wall of the boss 5' is cut away, forming a transverse recess *t*, which affords the necessary freedom for the swing of the arm and prevents the latter from fouling the boss 5'. It may be stated in passing that in lieu of the disk *h'*, any equivalent support or mounting for the character-disk *h''* may be substituted.

The operation of the invention is as follows:—With the presentation of the normal characters *n* (Fig. 5) the machine operates as any other type-writer, that is to say, in the ordinary way. In order to rotate a key to present the code character c to the eye and to the fingers of the operator, and assuming that the parts when in normal position are as represented in Figs. 7, 8, 9, the operator inserts the operating key S through the opening 6 of the wall of the casing 2, passing the tooth 8 thereof through the left-hand recess 6' (facing the observer). The member S is pushed inward until the conical end 9' thereof enters the corresponding depression m in the stem 10 of the plunger 11 (Fig. 9), the tooth 8 under the circumstances coming directly beneath the arm 14 of the tumbler 13. When the key S is thus inserted, the sides of the square portion 9 thereof are at an incline to the sides of the opening O in the wall d. By turning the key S to the right, the tooth 8 picks up or trips the arm 14 oscillating the latter and rotating the tumbler 13 through an arc sufficient to cause the arm 17 thereof to pass off and release the tongue 11' of the plunger 11 (see dotted position Fig. 7). The key S being rotated to effect the results just stated brings the faces of the portion 9 of the key S parallel to the walls of the opening O, (the tooth 8 having been swung to the upper dotted position in Fig. 15) allowing the said portion 9 to be pushed into the said opening O. This further inward movement of the operating key (S) forces the stem 10 out of the opening O, (the plunger 11 being free to respond to the inward push of the operating key because the arm 17 has been swung to a position to release the tongue 11' carried by the plunger) pushing the plunger 11 toward and against the spring 12 and compressing the latter. At the same time the portion 9 of the operating key enters the square hole O of the wall d of the type-writer character-key, whereupon a turning of the member S to the right will rotate the said key and by continuing the rotation through an arc of one-hundred and eighty degrees the character c (Fig. 6) will be presented, the disk h on which the normal character n is marked being swung to the bottom of the casing (Fig. 10), and the disk h'' to the top thereof, thus exposing said code character through the open top of the casing. When the key is thus reversed, the arms 14, 17 of the tumbler will drop by gravity against the inner face of the disk h. The member S having been turned 180 degrees to effect the reversal of the type-writer key brings the process 8 thereof in position to be withdrawn through the right-hand recess 6' when the key S is pulled out of the casing. To bring the type-writer key back to normal position, the member S is inserted as before (except that the tooth 8 is passed through the right-hand recess 6') and turned in the opposite direction as quite obvious from the drawings. A restoration of the type-writer key to its original or normal position causes the tumbler 13 to rock back to its original position, such rocking being brought about by the gravitating action of the arms 14, 17, the tumbler being provided with a peripheral lug x which strikes a shoulder or extension v formed at one end of the bearing d', said shoulder thereby arresting the tumbler to maintain the arms 14, 17 thereof in their proper relation to the normal position of the character-key, that is to say, the arm 14 is maintained in proper position to be engaged by the tooth 8 with the insertion of the operating key S as described, and the arm 17 is held in locking engagement with the tongue 11' of the plunger 11 which latter is restored to its original position by the spring 12 upon withdrawal of the key S.

Any equivalent means of turning or reversing the type-writer or character key is contemplated by our invention, and we do not wish to be limited to the specific form here shown and described.

Having described our invention, what we claim is:

1. In a type-writer, a casing having an open top and provided with hollow bosses, a key rotatably mounted in the casing, said key being provided with character-carrying disks disposed so as to be successively exposed through the open top of the casing with a rotation of the key through a given arc, a central wall connecting the character disks and provided with a polygonal opening for receiving one end of an operating key, terminal walls connecting the key-disks and receiving the hollow bosses of the casing, the wall of one of the bosses having a longitudinal slot, a spring-controlled plunger in the chamber of the slotted boss, a tongue on the plunger traversing the slot, a tumbler in the casing provided with an arm adapted to be actuated by the operating key aforesaid, a second arm on the tumbler adapted to sweep across the slot in front of the tongue for engaging the latter, a stem on the plunger normally positioned in the polygonal opening of the central wall and adapted to be engaged by the operating key, and a detachable member on the character key on which one of the characters are marked.

2. In combination with a sectional casing, a key provided with opposing disks, rotatably mounted in the casing, the latter having an open top for the successive exposure of the characters on the respective disks, a rotatable gravity tumbler in the casing, an arm on said tumbler, the casing being provided with an opening in the wall thereof for the insertion of a rotatable operating key, the character-key having a wall provided with a polygonal opening for receiving the operating key, a hollow longitudinally slotted boss on the casing, a spring-controlled plunger operating in said boss and provided with a tongue traversing the slot, a second arm on the tumbler normally engaging the tongue, the operating key being adapted to disengage said second arm from said tongue with a tripping of the first arm of the tumbler, and permit the operating key to enter the opening of the wall of the character-key, and thereby permit the actuation of the character key by means of the operating key with a further rotation of the latter.

3. In a type-writer, a rotatable key having oppositely disposed disks, one of said disks being permanent and having a character marked thereon, the other disk being removable and provided with a character.

4. In a type-writer, a rotatable character key, a casing therefor, a spring-controlled plunger mounted in the casing, a rotatable tumbler normally holding said plunger against movement, said tumbler operating to release the plunger and thereby permit rotation of the character-key.

5. In a type-writer, a rotatable character key, a casing therefor, a spring-controlled plunger mounted in the casing and coöperatively engaging the character-key under the tension of the spring, a key-operated rotatable tumbler normally holding the plunger against movement, and operating to release the plunger from the character-key with a given rotation of the tumbler.

6. In a type-writer, a rotatable key-operated character key, a casing therefor, a spring-controlled plunger mounted in the casing and coöperatively engaging the character key under the tension of the spring, a key-operated tumbler mounted within the casing and normally holding the plunger in its aforesaid coöperative engagement with the character-key, and operating to release the plunger from said engagement by a movement of the tumbler in a given direction.

7. In a type-writer, a rotatable key-operated character-key, a casing therefor, means in the casing engaging the character-key and holding the same against rotation, and key-operated means in the casing controlling said character-key engaging means.

In testimony whereof we affix our signatures, in presence of two witnesses.

JAMES C. E. ALLUM.
JOSIAH F. PERKINS.

Witnesses:
J. FREDERICKSON,
W. BERGGREN.

---

Copies of this patent may be obtained for five cents each, by addressing the "Commissioner of Patents, Washington, D. C."